United States Patent [19]
Carlyle et al.

[11] Patent Number: 5,213,019
[45] Date of Patent: May 25, 1993

[54] HEADSTOCK COOLING SYSTEM FOR A MACHINE TOOL

[75] Inventors: Robert B. Carlyle; Daniel P. Soroka, both of Horseheads; Harold E. Walburn, Elmira; Jyoti Mukherjee, Elmira Hts.; Raymond C. Cady, Horseheads; Terrence M. Sheehan, Elmira; James P. Peris, Horseheads, all of N.Y.

[73] Assignee: Hardinge Brothers, Inc., Elmira, N.Y.

[21] Appl. No.: 731,447

[22] Filed: Jul. 17, 1991

[51] Int. Cl.⁵ .................. B23Q 11/12; B23Q 11/14
[52] U.S. Cl. .................................. 82/142; 82/149; 82/900; 409/135; 384/900
[58] Field of Search .................. 82/900, 142, 149; 409/135, 136; 408/56; 384/9, 278, 313, 316, 317, 320, 321, 467, 476, 493, 900

[56] References Cited

U.S. PATENT DOCUMENTS

| | | | |
|---|---|---|---|
| 2,221,127 | 11/1940 | Bates | 82/900 X |
| 2,257,849 | 10/1941 | Martellotti | 82/900 X |
| 2,272,271 | 2/1942 | Mallory | 408/56 X |
| 2,281,971 | 5/1942 | Goddard | 384/900 X |
| 2,502,907 | 4/1950 | Welte | |
| 2,504,284 | 4/1950 | Voigt | 384/900 X |
| 2,725,775 | 12/1955 | Leifer | 82/900 X |
| 2,739,773 | 3/1956 | Rougemont | |
| 3,062,104 | 11/1962 | Deflandre | 82/900 X |
| 3,837,245 | 9/1974 | Schuler et al. | 82/149 |
| 4,133,230 | 1/1979 | Inaba et al. | 82/900 X |
| 4,580,471 | 4/1986 | Oyama et al. | |
| 4,907,478 | 3/1990 | Brown et al. | 82/149 |
| 4,981,056 | 1/1991 | Brown et al. | 82/149 |
| 5,027,527 | 7/1991 | Dorris | 82/900 X |

FOREIGN PATENT DOCUMENTS 360262 2/1962 Sweden ........................... 82/900

Primary Examiner—Z. R. Bilinsky
Attorney, Agent, or Firm—Shlesinger Arkwright & Garvey

[57] ABSTRACT

A headstock cooling system for a machine tool comprising a base having a top, bottom and a first fluid passageway extending centrally therethrough from the top to the bottom. A bed is mounted on the base top and provided with a second fluid passageway extending coaxially from the first fluid passageway and in fluid communication therewith. A headstock is mounted on the bed and is positioned coaxial with and directly above the second fluid passageway and includes means for communication with the second fluid passageway for directing a cooling fluid from the second fluid passageway out of the headstock thereby cooling the headstock over at least a substantial portion of the headstock.

28 Claims, 5 Drawing Sheets

HEADSTOCK COOLING SYSTEM FOR A MACHINE TOOL

BACKGROUND OF THE INVENTION

A lathe is a machine tool having one or more movable cutting elements which operate on a workpiece rotated by a headstock. The cutting elements, headstock and other movable components are in turn mounted on a bedway. The bedway on which the cutting elements move is typically manufactured from metal, such as steel or cast iron, and is secured to a base. The base itself is a large, bulky assembly which firmly anchors all of the machine components.

Current machine tools are designed to repeatedly reproduce cuts of high accuracy and extremely small tolerances. Currently, the military, aerospace and other industries are demanding even smaller tolerances of machined parts. Such exceptionally small tolerances require that numerous factors affecting the overall machine tool and the relationship between its individual component parts be controlled. For example, temperature fluctuations generated during machine operation can adversely impact the overall accuracy of the machine tool. In those cases, the dissimilar thermal expansion coefficients between the various metal components of the machine tool act to distort alignment. This is particularly true of the headstock, which contains a spindle rotating at extremely high speeds and consequently generating substantial amounts of heat. Also, heat transferred from the drive motor to the spindle and the bearings cause thermal deformation or expansion of the machine components, resulting in inaccurate alignment and cuts.

From the above, those skilled in the art will understand that there exists a need for an improved system of transferring heat generated at the headstock during machining of a workpiece. The resulting system and machine is one which is provided with means for effectively cooling the headstock and spindle assembly thereby assuring repeated cuts of small and extremely accurate tolerances.

OBJECTS AND SUMMARY OF THE INVENTION

The primary object of the disclosed invention is a system for cooling the headstock of a machine tool wherein heat generated during the cutting operation is minimized in its effect on the precision metal components of the machine.

An additional object of the disclosed invention is to provide a headstock cooling system which directs a continuous flow of cooling fluid over the headstock during operation of the machine.

Yet a further object of the disclosed invention is a machine tool provided with a cooling arrangement for the headstock which is integral with the base, bedway and headstock components.

Still another object of the disclosed invention is to provide a one-piece bedway which possesses a uniform rate of thermal expansion throughout.

A still further object of the disclosed invention is a machine tool assembly having a headstock housing provided with a series heat exchange fins to aid in dissipation of heat build-up from the spindle and bearings.

An additional object of the disclosed invention is to provide a shroud assembly for the headstock which assists in directing the cooling fluid flow over a substantial portion of the headstock.

A headstock cooling system for a machine tool comprising a base having a top, bottom and a first fluid passageway extending centrally therethrough from the top to the bottom. A bed is mounted on the base top and provided with a second fluid passageway extending coaxially from the first fluid passageway and in fluid communication therewith. A headstock is mounted on the bed and is positioned coaxial with and directly above the second fluid passageway and includes means for communication with the second fluid passageway for directing a cooling fluid from the second fluid passageway out of the headstock thereby cooling the headstock over at least a substantial portion of the headstock.

A machine tool provided with a headstock cooling means and containing a spindle rotatably mounted therein comprising a base having a top, bottom and a first fluid passageway extending centrally therethrough from the top to the bottom. A bed is mounted on the base top and provided with a second fluid passageway extending coaxially from the first fluid passageway and in fluid communication therewith. A headstock is mounted on the bed and positioned coaxial with and directly above the second fluid passageway and includes means for communication with the second fluid passageway for directing a cooling fluid from the second fluid passageway out of the headstock thereby cooling the headstock over at least a substantial portion of the headstock. A housing is also provided for the base, the bed and the headstock as well as a blower means for directing cooling fluid into the fluid passageway circuit.

DESCRIPTION OF THE DRAWINGS

The above and other objects and advantages and novel features of the present invention will become apparent from the following detailed description of the preferred embodiment of the invention illustrated in the accompanying drawings, wherein.

DESCRIPTION OF THE INVENTION

Figure 1:
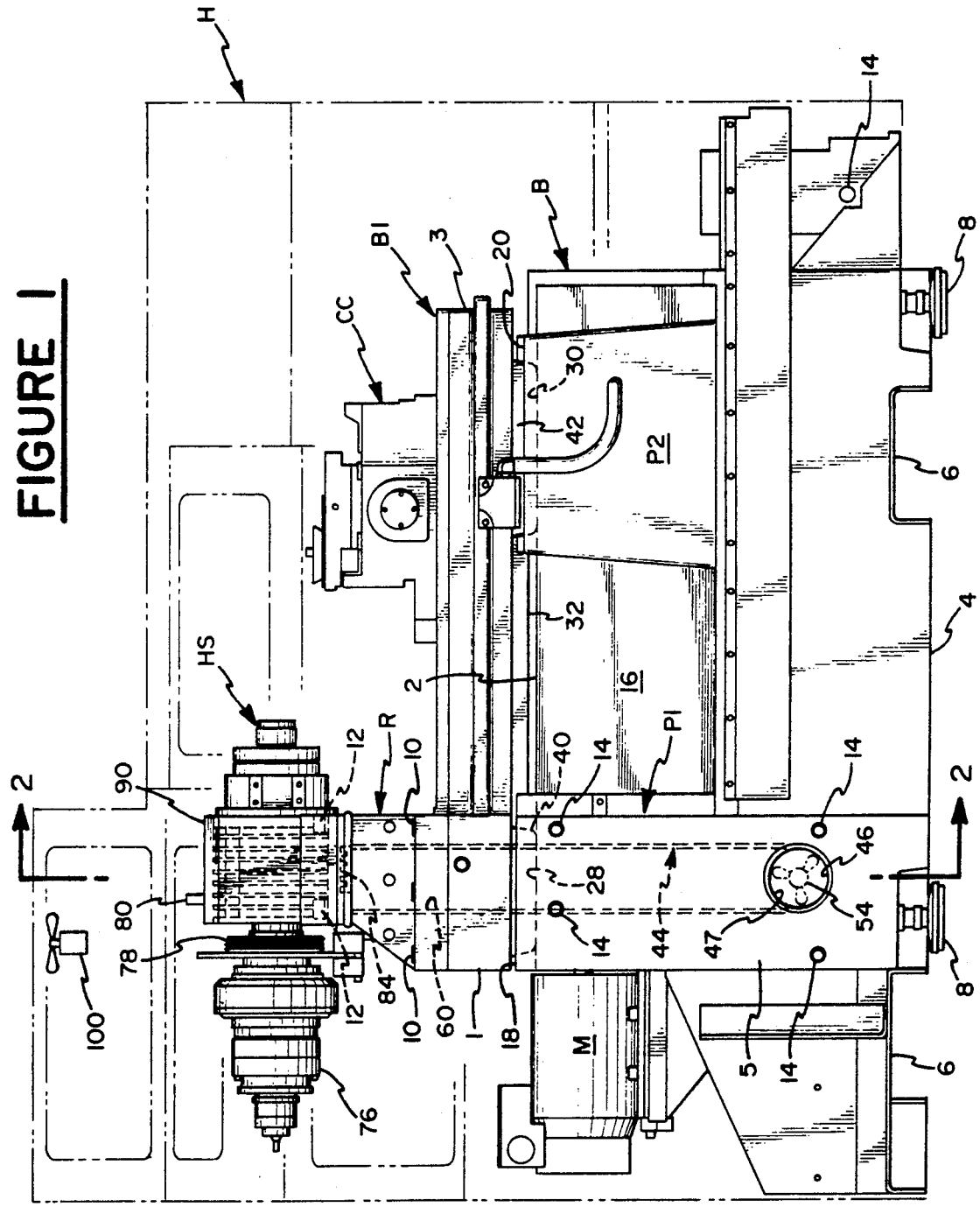
FIG. 1 is a side elevational view of the machine tool base, bedway and headstock with the housing shown in phantom lines and the fluid passageways shown by broken lines.
Figure 2:
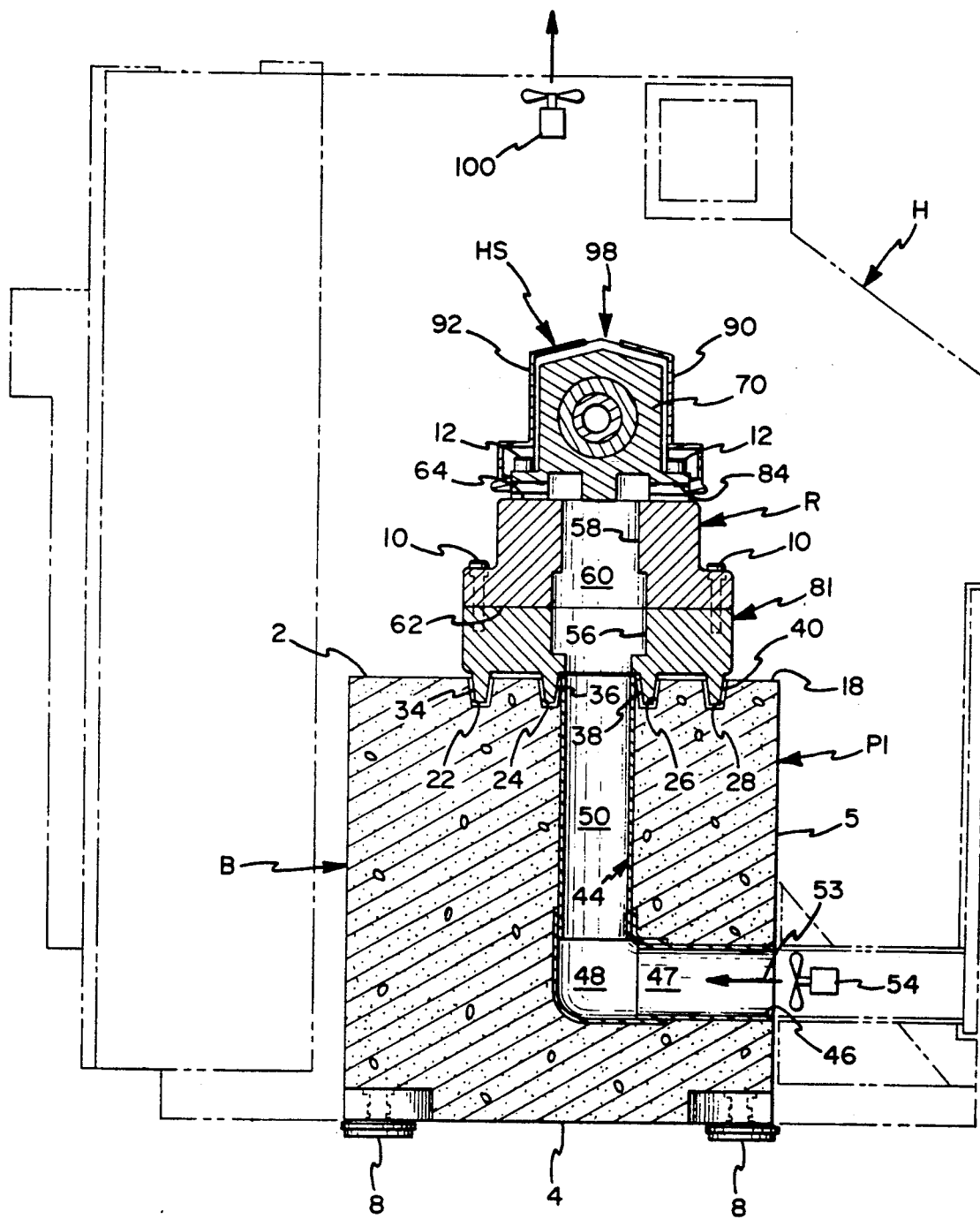
FIG. 2 is a sectional view taken along lines 2—2 of FIG. 1 including portions of the housing shown in phantom lines.

Machine tool base B, as best shown in FIGS. 1 and 2 is enclosed within a housing H partially shown by phantom lines. A one-piece bedway B1 having a first end 1 and second end 3 is mounted to the base B by grouting, as further explained. The bedway B1 contains a carriage and crosslide CC, movable along linear guideways in the bedway B1. A riser block R, is preferably bolted to the bedway B1 by a series of bolts 10. The headstock is then mounted by bolts 12 to the riser block R.

The base B is preferably of a cementitious material having controlled porosity. Control of base porosity allows the vibration dampening coefficient of the base B to be regulated. We have found that a polymer concrete manufactured and sold under the trade name HAR-CRETE ® (manufactured by Hardinge Brothers, Inc., Elmira, N.Y.) meets the necessary vibration damping, structural rigidity and thermal stability requirements of the present invention. The base B preferably includes leveling feet 8 which can be vertically adjusted to compensate for any irregularities in the floor in which the base B is set.

The base B includes a top surface 2 and a bottom surface 4. The bottom surface 4 of the base B is provided with central channels 6, as best shown in FIG. 1, to permit the base B to be lifted by a lift truck or the like. A number of threaded inserts 14 are shown disposed within the exterior surface of the base B for securing a housing H thereto. Also included within the base B are pedestals P1 and P2 provided with respective top surfaces 18 and 20. The pedestals P1 and P2 extend upwardly to a height approximating the top surface 2 of the base B. Angular surface 16 is disposed within the base B and separates the pedestal P1 from pedestal P2. The respective top surfaces 18 and 20 of the pedestals P1 and P2 are substantially uniplaner relative to each other.

Figure 3:
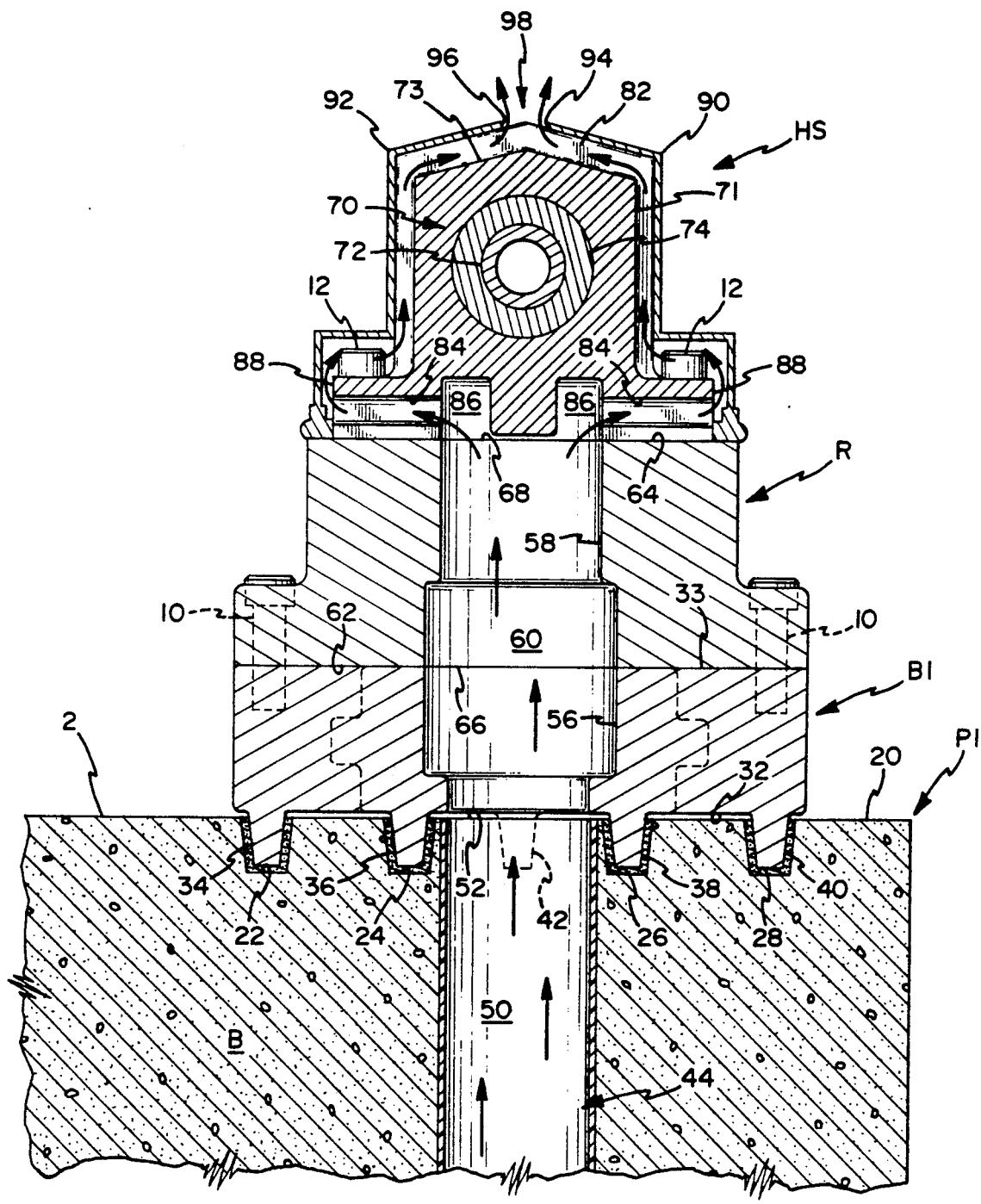
FIG. 3 is an enlarged, fragmentary cross sectional view of the headstock with arrows indicating the path of cooling fluid flow over the headstock.

As best shown in FIGS. 2 and 3, the pedestal P1 is further provided with a series of parallel recesses 22, 24, 26 and 28 formed in the uniplaner top surface 18 thereof. Additional parallel recesses 30 extend within pedestal P2 and are shown by phantom lines in FIG. 1. All of the recesses 22, 24, 26, 28 and 30 are disposed parallel to one another and have a uniform length substantially spanning the length of the top surfaces 18 and 20 of the pedestals P1 and P2, as well as have a uniform width.

The bedway B1, as best shown in FIGS. 1 and 2, is of a one-piece design and construction throughout. The bedway B1 has a length extending from the pedestal P1 to the pedestal P2 and has a lower surface 32 from which a series of tongues 34, 36, 38 and 40 extend. Each of the tongues 34, 36, 38 and 40 interfit with their respective parallel recesses 22, 24, 26 and 28. As best shown in FIG. 1, a tongue 42 also extends from the lower surface 32 near the second end 3 of the bedway B1 and interfits with the parallel recess 30 in the pedestal P2. Additional recesses (not shown) extend in the pedestal P2 and likewise, additional tongues (not shown) extend in bedway B1 parallel to tongue 42.

The bedway B1 is attached to the top surface 2 of the base B by grouting according to a process described in U.S. Pat. No. 4,907,478 to Brown, deceased et al. and U.S. Pat. No. 4,981,056 to Brown, deceased et al., both of which are incorporated by reference herewith. The surfaces of the tongues 34 through 42 and the parallel recesses 22 through 28 and 30 are roughened or finished as appropriate to increase the quality of the fit after grouting. The predetermined quantity of fluidic hardenable grout material is puddled into each of the grooves or recesses 22 through 28 and 30 of each of the respective pedestals P1 and P2. The grout material, fills approximately ½ of the groove or recess.

Applicants have found that suitable grout is manufactured under the name Super Alloy Silver 500 Precision Assembler and it is distributed by Philadelphia Resins Inc. This grout material has minimum shrinkage and vibration dampening characteristic which is dissimilar from that of the cementitious material of which the base B is manufactured and the cast iron material for which the bedway B1 is manufactured. Likewise, the coefficient of thermal expansion of the grout material, when hardened, is dissimilar from that of the cementitious material of the base B and the cast iron material of the bedway B1. As a result, Applicants have found that the maximum vibration dampening is achieved since the natural resin of the three materials cannot be very easily tuned.

Cast within the base B is a first fluid passageway 44, as best shown in FIGS. 1 and 2. The passageway 44 within the base B comprises an opening 46 within the front wall 5 of the pedestal P1 leading to a horizontal portion 47, elbow portion 48 and a vertical portion 50 which terminates at an opening 52 having a size approximating the diameter of the first fluid passageway 44. In a preferred embodiment, the aforementioned portions which make up the first fluid passageway 44 are individual sections of four inch diameter PVC tubing, cast within the base B. A fan 54 or similar blower means is mounted within the housing H at the opening 46 of the first fluid passageway 44. The positioning of the fan 54 at the opening 46 of the first fluid passageway 44 is to force air or similar cooling fluid into the passageway 44.

As noted above and as best shown in FIG. 3, the bedway B1 is secured to the top surface 2 of the base B. The first end 1 of the bedway B1 is provided with an opening 56 extending through the lower surface 32 and the top surface 33. The riser block R which is secured to the top surface 33 of the first end 1 of bedway B1 by bolts 10 is provided with an opening 58 which extends from the bottom surface 62 to the top surface 64 of the riser block R. When the riser block R is positioned over the first end 1 of bedway B1, opening 56 and opening 58 mate at portion 66. Openings 58 and 56 are coaxially aligned and combine to form a second fluid passageway 60 in fluid communication with the first fluid passageway 44 of the base B. The second fluid passageway 60 terminates at port or opening 68 disposed within the top surface 64 of the riser block R.

Figure 4:
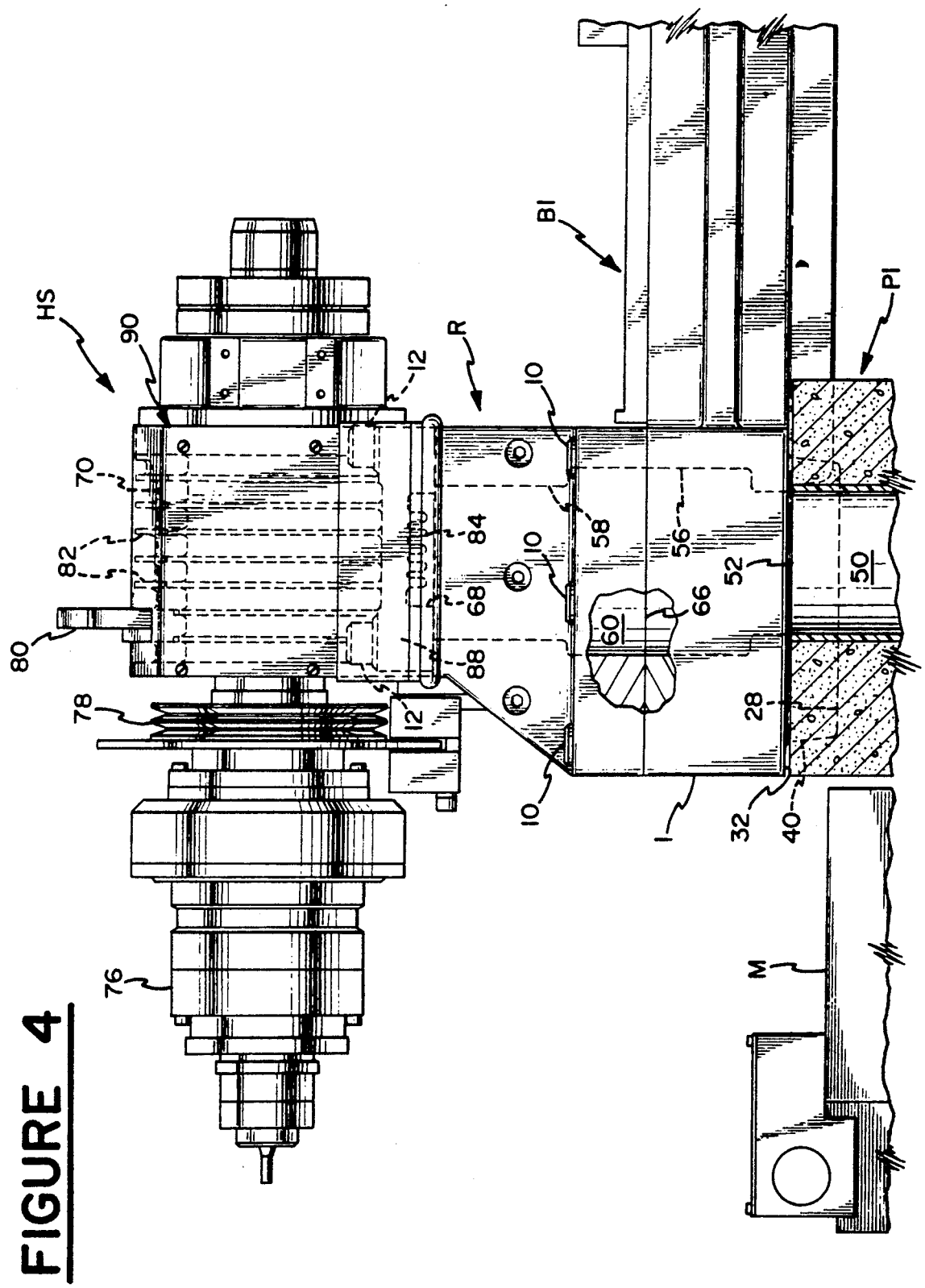
FIG. 4 is a enlarged, fragmentary side elevational view of the headstock assembly with a portion of the base shown in cross section and the fluid passageway shown in broken lines.

As best shown in FIGS. 3 and 4, the headstock HS includes a headstock housing 70 in which is rotatably mounted a spindle 72 with appropriate bearings 74. Also shown is a pneumatic collet closer 76 and pulley arrangement 78 which is connected by belts (not shown) to drive motor M. A portion of the belt tightener 80 is shown extending from the top surface 73 of the headstock housing 70. The headstock housing 70 is a solid one-piece construction of cast iron. The headstock housing 70 is mounted by bolts 12 or other appropriate means to the riser block R. A series of heat exchange ribs 82 run parallel to each other and extend along an exterior surface formed by sides 71 and top 73 of the headstock housing 70. The heat exchange ribs 82 function to minimize heat buildup around the spindle 72 and bearings 74.

The interior of the headstock housing 70 is provided with a series of vent passageways 84, as best shown in FIG. 3. The vent passageways 84 extend laterally from the interior of the headstock housing 70 to the exterior thereof within headstock flanges 88. A headstock central opening 86 is disposed within the interior of the headstock housing 70 and fluidly connects the vent passageways 84 with the second fluid passageway 60 at port 68 of the riser block R.

Figure 5:
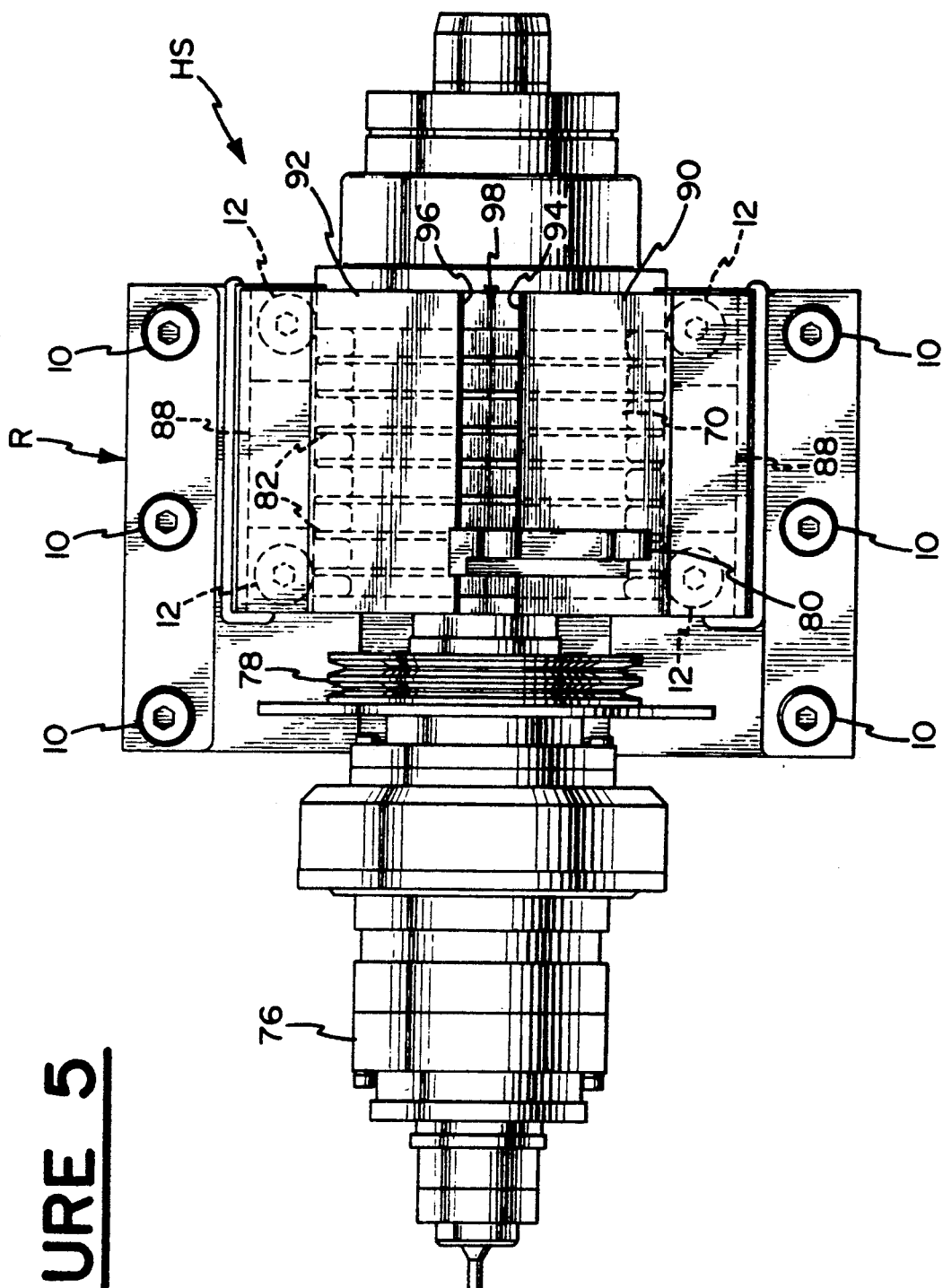
FIG. 5 is a top plan view showing the headstock assembly and depicting portions the heat exchange fins in broken lines.

As best shown in FIGS. 3 and 5, two separate shroud plates 90 and 92 are positioned about the headstock housing 70. Each of the plates 90 and 92 are configured to extend around the sides 71 and top 73 of the headstock housing 70. Shroud plate 90 is additionally configured to allow the belt tightener 80 to protrude through its top as best shown in FIG. 5. The top edge 94 of shroud plate 90 and the top edge 96 of the shroud plate 92 form a longitudinal opening 98 disposed above the headstock housing 70.

Turning now to FIG. 3 and in particular to the direction of the arrows, cooling fluid which leaves the vent passageways 84 is urged by the shroud plates 90 and 92 against the side surfaces 71 and top surfaces 73 of the headstock 70 for eventual release out of the longitudinal opening 98. In this way, the cooling fluid is allowed to contact a major portion of the exterior surface of the headstock housing 70 including the numerous heat exchange ribs 82.

As best shown in FIG. 1, an exhaust fan 100 is disposed above the longitudinal opening 98 of the headstock HS. The exhaust fan 100 will draw cooling fluid out of the longitudinal opening 98 and away from the machine.

In use, the blower fan 46 and the exhaust fan 100 are turned on prior to machining thereby causing a steady stream of outside cooling fluid or air to be drawn into the opening 46 of the first fluid passageway 44. This cooling fluid is then forced through the second fluid passageway 60 extending through the bedway B1 and riser block R. As the cooling fluid reaches the headstock central opening 86, it is directed via a vent passageway 84 along either side 71 of the headstock and out flanges 88. The shroud plates 90 and 92 confine this portion of the cooling fluid to that space extending between the shroud plates 90 and 92 and the top 73 and sides 71 of the headstock housing 70. The cooling fluid is thereby forced between the numerous heat exchange ribs 82 disposed along the side surfaces 71 of the headstock housing 70. As the cooling fluid reaches the top surface 73 of the headstock housing 70, it is drawn by exhaust fan 100 out of the longitudinal opening 98 positioned above the headstock housing 70. This exhausted, cooling fluid is then directed away from the housing and into the ambient air.

Applicants have found that the present invention provides a superior means of directing a steady stream of cooling fluid over a major portion of the headstock HS thus minimizing excessive heat build-up and protecting the spindle bearings BR from overheating. Additionally, the one-piece design of the bedway B1 insures that any change in the coefficient of expansion within the bedway B1, will be uniform throughout from the first end 1 to the second end 3 thereby reducing alignment errors between the headstock HS and the carriage and crosslide CC. The net result of this thermally uniform bedway B1 is that dimensional changes at ends 1 and 3 are minimized.

While this invention has been described as having a preferred design, it is understood that it is capable of further modifications, uses and/or adaptions of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. A headstock cooling system for a machine tool comprising:
   a) a base having a top, a first region and a first fluid passageway extending therethrough from said first region to said top;
   b) a bed mounted on said base top and provided with a second fluid passageway connected to said first fluid passageway;
   c) a headstock having a bottom, top and sides, said headstock mounted on said bed and positioned above said second fluid passageway and including means communicating with said second fluid passageway;
   d) said means communicating with said second fluid passageway including a headstock central opening;
   e) said headstock central opening including lateral venting means extending from said central opening and out said sides of said headstock;
   f) shroud means for directing a cooling fluid exiting from said lateral venting means upwardly along said headstock sides and across said headstock top surface, said shroud means including sidewalls and a top surface; and
   g) said shroud means further including means for vertically exiting the cooling fluid from said shroud means top surface.

2. A cooling system as in claim 1, and wherein:
   a) said first passageway includes an opening in said base to permit entrance of a cooling fluid therein.

3. A cooling system as in claim 2, and wherein:
   a) said bed comprises a one-piece casting having uniform heat of expansion.

4. A cooling system as in claim 3, and wherein:
   a) said one-piece casting having first and second ends;
   b) said first end including means for supporting a headstock; and,
   c) said second end including means for supporting a tool holder or work support means.

5. A cooling system as in claim 3, and wherein:
   a) said one-piece casting is iron.

6. A cooling system as in claim 4, and wherein:
   a) said means for supporting a headstock comprises a riser block provided with an opening co-extensive with at least a portion of said second fluid passageway.

7. A cooling system as in claim 1, and wherein:
   a) said headstock includes heat exchange fins projecting from said exterior surface of said headstock.

8. A cooling system as in claim 1, and wherein:
   a) said shroud comprises two plates.

9. A cooling system as in claim 1, and wherein:
   a) said headstock is cast iron.

10. A cooling system as in claim 1, and further comprising:
    a) at least one blower means for circulating said cooling fluid through said cooling system.

11. A cooling system as in claim 10, and wherein:
    a) said at least one blower means is associated with said first fluid passageway for directing cooling fluid therein.

12. A headstock cooling system as in claim 1 and wherein:
    a) said means for vertically exiting the cooling fluid includes an opening extending through said shroud means top surface.

13. A headstock cooling system as in claim 12, and wherein;

a) said means for vertically exiting the cooling fluid includes an exhaust fan positioned above said opening.

14. A machine tool provided with a headstock cooling means for a spindle rotatably mounted therein comprising:
 a) a base having a top, a first region and a first fluid passageway extending therethrough from said first region to said top;
 b) a bed mounted on said base top and provided with a second fluid passageway connected to said first fluid passageway;
 c) a headstock having a bottom, top and sides, said headstock mounted on said bed and positioned above said second fluid passageway and including means communicating with said second fluid passageway;
 d) said means communicating with said second fluid passageway including a headstock central opening;
 e) said headstock central opening including lateral venting means extending from said central opening and out said sides of said headstock;
 f) shroud means for directing a cooling fluid exiting from said lateral venting means upwardly along said headstock sides and across said headstock top surface, said shroud means including sidewalls and a top surface;
 g) said shroud means further including means for vertically exiting the cooling fluid from said shroud means top surface;
 h) a housing for said base, said bed and said headstock;
 i) blower means associated with said housing for supplying a cooling fluid into said first fluid passageway, through said second fluid passageway and around said headstock for cooling said headstock over at least a substantial portion of the exterior surface of said headstock; and
 j) exhaust means associated with said housing positioned above said headstock for venting the cooling fluid from said housing after cooling of said headstock.

15. A cooling system as in claim 14, and wherein:
 a) said base is cementitious material.

16. A cooling system as in claim 15, and wherein:
 a) said first fluid passageway consists of tubing cast within said base.

17. A machine tool as in claim 14, further comprising:
 a) a second blower means associated with said exhaust means for exhausting cooling fluid out of said housing after contact with said headstock.

18. A machine tool as in claim 14, wherein:
 a) said first fluid passageway includes an opening in said base to permit entrance of a cooling fluid therein.

19. A machine tool as in claim 18, wherein:
 a) said bed comprises a one-piece casting having uniform heat of expansion.

20. A machine tool as in claim 19, wherein:
 a) said one-piece casting has first and second ends;
 b) said first end includes means for supporting a headstock; and,
 c) said second end includes means for supporting a tool holder or work support means.

21. A machine tool as in claim 19, wherein:
 a) said one-piece casting is iron.

22. A machine tool as in claim 20, wherein:
 a) said means for supporting a headstock comprises a riser block provided with an opening co-extensive with at least a portion of said second fluid passageway.

23. A machine tool as in claim 14, wherein:
 a) said base is cementitious material.

24. A machine tool as in claim 23, wherein:
 a) said first fluid passageway consists of tubing cast within said base.

25. A machine tool as in claim 14, wherein:
 a) said headstock includes heat exchange fins projecting from said exterior surface of said headstock.

26. A machine tool as in claim 14, wherein:
 a) said shroud means comprises two plates.

27. A machine tool as in claim 14, wherein:
 a) said headstock is cast iron.

28. A machine tool as in claim 14 and wherein:
 a) said means for vertically exiting the cooling fluid includes an opening extending through said shroud means top surface.

* * * * *